Patented June 23, 1942

2,287,189

UNITED STATES PATENT OFFICE 2,287,189

STABLE COMPOSITIONS CONTAINING VINYLIDENE CHLORIDE POLYMERIC PRODUCTS

Lorne A. Matheson, Raymond F. Boyer, and Gerald H. Coleman, Midland, Mich., assignors to The Dow Chemical Company, Midland, Mich., a corporation of Michigan No Drawing. Application September 19, 1940, Serial No. 357,407

6 Claims. (Cl. 260—80)

The present invention relates to compositions comprising polymeric vinylidene chloride products and certain light and heat stabilizers therefor.

The polymers of vinylidene chloride alone, its copolymers with other polymerizable materials, various plasticized compositions thereof, and certain ways in which they may be made, are described in U. S. Patents Nos. 2,160,903-4 and 2,160,931-948. The polymers of vinylidene chloride alone and its co-polymers and plasticized compositions are herein referred to as "polymeric vinylidene chloride products." These products, or most of them, are capable of being molded to form useful articles under the combined effects of heat and pressure. Some of them exhibit sufficient solubility in certain solvents, more particularly at elevated temperatures, to permit their being cast as films. In most cases, the articles produced either by molding, extrusion, or by casting from solution of polymeric vinylidene chloride products are subject to decomposition when exposed for prolonged periods to the effects of light. This appears to be particularly true of articles having thin cross section, especially when they are subjected to the effects of ultraviolet light. This apparent shortcoming of articles produced from polymeric vinylidene chloride products makes it highly desirable to obtain stabilizers for these products which will prevent or at least minimize the darkening effect heretofore observed when the products have been exposed to light. Many of the polymeric vinylidene chloride products exhibit evidence of at least partial decomposition when subjected to temperatures substantially above the softening point for brief periods or even when subjected to somewhat lower temperatures for prolonged periods. Hence, in addition to the desirability of providing light stabilizers, it is also desired to provide materials which will stabilize these polymer products against the decompositional effect of heat.

It is accordingly among the objects of the present invention to provide a polymeric vinylidene chloride product stabilized against the darkening and embrittling effects of light. Another object is to provide a composition comprising a polymeric vinylidene chloride product and a light stabilizer therefor. A further object is to provide a composition of a polymeric vinylidene chloride product and a heat stabilizer therefor. Particular objects will appear hereinafter.

It has now been found that the foregoing and related objects may be attained through the incorporation in a polymeric vinylidene chloride product of an aryloxy-alkyl ester of an unsaturated mono- or di-carboxylic acid. More particularly, it has been found that phenoxy- and hydrocarbon-substituted-phenoxy-alkyl esters of unsaturated mono- and di-carboxylic acids serve as excellent stabilizers against the effects of light for polymeric vinylidene chloride products. These same stabilizers also improve the resistance of the polymeric products to thermal decomposition. The aryloxy-alkyl esters of unsaturated acids may be incorporated in the polymeric vinylidene chloride product in amounts which generally vary from about 1 to about 10 per cent, based on the weight of the said polymeric product. For most purposes, it has been found that from 3 to 10 per cent of the stabilizer is most advantageous to effect the desired stabilizing action against light and heat.

The aryloxy-alkyl esters of unsaturated acids may be added to the polymeric product in various ways. For example, if the polymer or co-polymer is capable of being dispersed or dissolved in an organic solvent, the stabilizer may be added to the said solution and the stabilized polymeric product obtained from the solution in the desired form. Alternatively, the polymeric product may be masticated with the stabilizer, which may suitably be dissolved in a small amount of solvent, on compounding rolls in the methods well known to the art.

Regardless of the manner in which the herein concerned stabilizers are added to the polymeric products, it has been found that they exhibit a remarkable stabilizing effect on the polymeric material when the latter is exposed to light. Thus, an untreated film or filament of a vinylidene chloride product may assume a dark brown or black coloration after exposure to sunlight. By way of contrast, the composition containing relatively small amounts of an aryloxy-alkyl ester of the type herein concerned when exposed to sunlight in like manner and in the same physical state will resist discoloration for periods up to several months or longer. Similarly, such stabilized compositions, when subjected to temperature conditions which injuriously affect the blank, remain much lighter colored than the blank.

The following example illustrates the practice of the invention:

A 20 per cent solution in dioxane of the co-polymer of vinylidene chloride with about 10 per cent of ethyl acrylate was treated with varying amounts of each of the aryloxy-alkyl esters of unsaturated acids as indicated in the following table. From the so-formed solution of co-polymers and stabilizing agents, films 0.003 inch thick were cast on clear glass plates and were then exposed in the fadeometer for 46 hours. An observation was made of the per cent of the available visible light which was transmitted through the samples, both before and after exposure. This factor gives an indication of the amount of darkening on exposure to light.

Table

| Added agent | | Percent visible transmission | |
|---|---|---|---|
| Amount | Kind | Before | After 46 hrs. |
| *Percent* | | | |
| 3 | 2-phenoxy-ethyl furacrylate | 90 | 66 |
| 10 | 2-phenoxy-ethyl cinnamate | 87 | 78 |
| 3 | Di-(2-phenoxy-ethyl) fumarate | 89 | 70 |
| 10 | 2-(4-tertiarybutyl-phenoxy)-ethyl crotonate | 90 | 81 |
| 0 | Blank (average of 6) | 85 | 60 |

It is observed from the table that all of the compositions containing compounds falling within the indicated class are much more stable to light when subjected to the rigorous test conditions prevailing in the fadeometer than are the untreated blanks. Numerous other compounds falling within the meaning of the expression "aryloxy-alkyl esters of unsaturated mono- and di-carboxylic acids" were tested and found to give comparable results to those listed in the tables when employed in concentrations varying from 1 to 10 per cent based on the weight of the polymeric vinylidene chloride product being tested. Among the other compounds in the operative class here concerned are: 2-(2,4-dichlor-phenoxy)-ethyl cinnamate, 2-(2,4,6-trichlor-phenoxy)-ethyl crotonate, 2-(2-xenoxy)-isopropyl crotonate, di-(2-phenoxy-ethyl) maleate, 2-phenoxy-ethyl methacrylate, 2-(2-chloro-4-tertiary butyl-phenoxy)-isopropyl crotonate, 2-phenoxy-ethyl oleate, 2-phenoxy-ethyl linoleate, di-(phenoxy-butyl) fumarate, and 2-phenoxy-ethyl eleostearate.

The invention has been illustrated with particular reference to the co-polymer of vinylidene chloride and ethyl acrylate. It is to be understood that the invention is not limited to its use in connection with this co-polymer but that it may be applied equally as effectively to other co-polymers of vinylidene chloride such as those with vinyl chloride, vinyl acetate, styrene, methyl methacrylate, and the like. In its practical application, the invention appears to be limited only by the requirement that the polymeric vinylidene chloride product to be treated is one which, without a light stabilizing agent, shows evidence of decomposition when exposed to light.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A composition of matter comprising a polymeric vinylidene chloride product, and, as a stabilizer therefor, an aryloxy-alkyl ester of an unsaturated carboxylic acid containing a maximum of 2 carboxylic groups.

2. A composition of matter comprising a polymeric vinylidene chloride product, and, as a stabilizer therefor, an aryloxy-alkyl ester of an unsaturated mono-carboxylic acid.

3. A composition of matter comprising a polymeric vinylidene chloride product, and, as a stabilizer therefor, an aryloxy-alkyl ester of an unsaturated di-carboxylic acid.

4. A composition of matter comprising a polymeric vinylidene chloride product, and, as a stabilizer therefor, 2-phenoxy-ethyl cinnamate.

5. A composition of matter comprising a polymeric vinylidene chloride product, and, as a stabilizer therefor, 2-(4-tertiarybutyl-phenoxy)-ethyl crotonate.

6. A composition of matter comprising a polymeric vinylidene chloride product, and, as a stabilizer therefor, di-(2-phenoxy-ethyl) fumarate.

LORNE A. MATHESON.
RAYMOND F. BOYER.
GERALD H. COLEMAN.